Patented July 28, 1953

2,647,062

UNITED STATES PATENT OFFICE 2,647,062

METHOD OF MAKING REFRACTORY MASSES AND BATCH

Frank E. Lathe, Ottawa, Ontario, Canada, assignor to Canadian Refractories Limited, Montreal, Quebec, Canada, a corporation of Canada No Drawing. Application April 7, 1950, Serial No. 154,723

24 Claims. (Cl. 106—58)

This invention relates to basic refractories and more particularly to a method of producing such refractories at low temperature by reaction in situ of selected material.

In prior applications Serial Numbers 84,345, filed March 30, 1949, now Patent No. 2,621,131, December 9, 1952, and 134,930 filed December 24, 1949, now Patent No. 2,599,184, June 3, 1952, covering the use of preformed or natural low-melting silicates for bonding granular materials, consisting essentially of (1) lime, magnesia and silica, and (2) magnesia, alumina and silica, respectively, it has been emphasized that in the practice of these inventions one must carefully avoid reaction between fine portions of the refractory material and the non-refractory silicate prior to melting of the latter and formation of a substantial amount of liquid, which is required to shrink the mass and bond the refractory particles firmly together. It is pointed out that this difficulty can be avoided by either omitting the finer particles of the refractory constituent or by adding the non-refractory constituent itself in granular form.

Strangely enough, it has now been found that in consolidating granular particles of such refractory material advantage can be taken of this very tendency of fine particles to react with one another much more rapidly than do coarse particles. Indeed it has been found that marked technical and economic advantages are obtained by forming the non-refractory constituent in situ in the granular particles.

Essentially, the invention is a simplified method of making refractory masses and shapes which comprises heating an intimate mixture of two widely different types of materials. The first type consists of relatively coarse granular particles containing an alkaline earth (reactive basic oxide), including particularly (1) lime, substantially without alumina, but with or without magnesia and (2) magnesia, in the substantial absence of lime, and with or without alumina. All of the alkaline earths (magnesia, lime, strontia and baryta) form both refractory orthosilicates and non-refractory or eutectic silicates which melt below 1550° C. The reactive basic oxide must always be present in the granular material in amount at least 6% by weight in excess of that required to form, at ultimate equilibrium with all the silica present, the orthosilicate containing only the basic oxide in question. The second type consists of starting material for the non-refractory silicate, and the formation of the non-refractory silicate in situ is ensured by the provision in the over-all mixture of such grain sizes of reactants that the surface area of the free and combined silica is at least 42% of the total surface area of the non-volatile constituents of all the particles, that is, the initial reaction product is a non-refractory silicate containing at least 42% silica. The two types of material are so proportioned and mixed that the amount of silica in the mixture is no more than will combine at ultimate equilibrium to form the orthosilicate containing only the basic oxide in question. The mixture is then heated, and reaction takes place in two distinct stages, the first of which is essentially the formation and fusion of the non-refractory silicate in situ. The liquid thereupon coats the refractory granules, and, upon further heating, there follows the second stage, in which reaction occurs between the liquid and excess reactive basic oxide in the granules, whereby the liquid is itself substantially eliminated by conversion into the corresponding refractory silicate, and the granules are bonded into a consolidated and highly refractory mass.

Not only has it thus become readily possible to form and melt the non-refractory silicate in situ, but, by the proper control of grain size, one can as desired vary over a wide range the course of the reactions and the properties of the composite mass or shape, such as the temperature at which bonding or setting will begin, the composition and amount of liquid formed, the viscosity of the liquid, the range of temperature during which the plastic condition of the composite mass will persist, and even the density and other physical properties of the ultimate product.

In order to explain the method by which this invention can be commercially applied to a wide variety of refractory materials, with very striking results, it is desirable to first set out as fully as possible the fundamental principles upon which the invention is based. These principles are in part well known, but in their relation to the bonding of refractory materials they have largely been evolved as a result of experiments carried out over a period of several years, together with a continuous attempt to explain the results obtained by consideration of the phase equilibrium diagrams involved. Whether wholly accurate or not, they will serve as an adequate guide in the practice of the invention by those versed in the art. They will later be supplemented by numerous examples illustrating particular applications of the principles in question.

1. When silica and a basic oxide with which it can react in the solid condition are mixed and heated, the rate of reaction occurring in the initial stages depends upon the area of the surfaces of actual contact between the reactants. It is for this reason that fine particles react so much more rapidly than do coarse particles.

2. For any two solid reactants heated in contact, the contact surfaces are equal, and prior to liquid formation there is consequently a tendency for them to react in proportion to the weights corresponding to equal surfaces; this tendency, however, may be overbalanced in the solid condition by the higher heat of formation of a particular compound of the two reactants, which is thereby preferentially formed.

3. When two oxides which are potential reactants are mixed and subjected to a rising temperature, they tend to form liquid at the lowest temperature possible, and this may be the melting point of the lowest-melting eutectic in the binary system. If, however, a compound has already been formed, the temperature of initial liquid formation may be the melting point of some other eutectic. For example, in the case of lime and silica there is a strong tendency for highly refractory dicalcium silicate to form during a long period of heating at a relatively low temperature; since there are several compounds and eutectics in this system, the eutectic liquid which subsequently forms depends upon which oxide is present in excess and the amount of that oxide.

4. The course of reaction between two oxides may depend upon the rate of heating. Slow and protracted heating below the melting point of any eutectic in the system tends to promote the formation of a compound, whereas, with very rapid heating, melting of the eutectic usually occurs before compound formation can proceed to any considerable degree, in which case the quantity of liquid existing at any given temperature is normally much greater than with slow heating.

5. Once liquid has been formed from two oxides, it begins to react with or take into solution as much of the remaining solids as can be absorbed at that temperature, and the course of reaction or absorption is largely determined by the relative surface areas of those solids. If, for example, very coarse lime be mixed with a small proportion of silica so finely ground that its surface area greatly exceeds that of the lime, the course of reaction is towards the formation of a more siliceous liquid as long as the surface area of the silica predominates; when the silica has nearly disappeared and the surface area of the lime in turn predominates, the course of reaction is reversed and the liquid becomes more basic until no more solid can be absorbed at the temperature in question. In the general case, depending upon the conditions prevailing, any of the following may occur:

(a) Complete melting.

(b) Increase in amount of liquid, without complete melting.

(c) Solution of one solid and simultaneous precipitation of another the limit of solubility of which has been reached.

(d) Complete solidification.

(e) Steps b and c, or b, c and d, occurring in more or less rapid succession.

6. With three or more reactants, the course of reaction is similar except that selectivity is more likely to play a part. When lime, magnesia and silica are the reactants, preferential reaction of lime and silica occurs both in the initial and final stages, and the selectivity is of two different types. When fine silica reacts with coarse dolomite, the eutectic melting at 1321° C. (containing 61.5 silica, 30.5 lime and 8.0% magnesia) is formed first, even though this involves the selective extraction of lime from the lime-magnesia complex. Ultimately, when this eutectic reacts with a large excess of dolomite, all the magnesia appears as periclase, along with tricalcium silicate and free lime, the magnesia which had been in combination being set free in the process. With three reactants, the early precipitation of a relatively refractory intermediate or end product occurs more frequently than when only two are present.

7. When reaction occurs between granular solids at such a temperature that little or no liquid is formed at any time, the product is not strongly bonded, either hot or after cooling.

8. When considerable liquid is formed in a mass of granular materials, the cooled mass possesses a strong bond and is well consolidated. The useful range has been found to be 6-30% by weight of the refractory material to be bonded.

9. Upon heating granular materials of the type herein described, the normal course of reactions as determined by periodic examination of the heated mass with a poker or other sharp instrument is as follows:

(a) Development of stickiness and plasticity as initial liquid forms, mainly from the finer ingredients of the mass.

(b) Increasing stickiness with the formation of more liquid.

(c) Decreasing stickiness and increasing hardness as the liquid reacts with the coarser refractory granules and is itself converted to refractory compounds which are solid at the temperature in question.

(d) Ultimate development of a highly refractory mass which, even at 1600-1700° C., is hard and strong and shows no evidence of the presence of liquid. This strength is normally preserved when the mass is cooled to room temperature. In the case of dicalcium silicate formation, dusting and disintegration may occur on cooling unless a stabilizing agent such as boric acid is added to prevent inversion from the beta to the gamma form.

10. Although the importance of the relative surface areas of the reacting oxides will be clear from the above, a practical method of calculating such areas is still required for the application of this invention.

The determination of the relative surface areas of reactants is based upon their screen analyses. Any screen scale may be used, but as an illustration the widely adopted Tyler scale, based on the principle of square openings each twice the area of the next smaller size, will be taken. It will be assumed that the average diameter of the particles which have passed through a given screen and been retained on the next smaller of the series is greater than the diameter of the smaller opening by one-third of the difference between the two. While it is recognized that this relation will vary somewhat with each screen analysis, it has proved a sufficiently close approximation for the purpose. Further, the method is satisfactory whether the screens of the Tyler series are all used or every second one is omitted. In fact, so great is the relative surface area of very fine fractions that, neglecting any greater refinement, it has been found satisfactory to take the average diameter of all the material passing 100 mesh as 0.0020" (0.05 mm.).

In the accompanying table there are listed the mesh sizes most commonly used for refractory materials, and the corresponding linear measurements of the actual Tyler openings. From these, the average diameter has been calculated for particles passing one and retained on the next succeeding screen of the series, using the assumptions given above. In the final column, the relative areas per unit weight of particles of the given size are shown, these areas being inversely proportional to the diameters in question, a relation that holds rigidly for particles of any given shape. For convenience, the size passing 3/8" (9.42 mm.) and retained on 3 mesh has been taken as unity.

| Mesh | Opening in— | | Particle Size | Estimated Average Particle Diameter Inches | Relative Area per Unit Weight |
| --- | --- | --- | --- | --- | --- |
| | Inches | Mm. | | | |
| 3/8" | 0.371 | 9.423 | | | |
| | | | −3/8"+3 m | 0.2990 | 1.00 |
| 3 mesh | 0.263 | 6.680 | | | |
| | | | −3+4 | 0.2110 | 1.42 |
| 4 mesh | 0.185 | 4.699 | | | |
| | | | −4+6 | 0.1490 | 2.01 |
| 6 mesh | 0.131 | 3.327 | | | |
| | | | −6+8 | 0.1057 | 2.83 |
| 8 mesh | 0.093 | 2.362 | | | |
| | | | −8+10 | 0.0743 | 4.02 |
| 10 mesh | 0.065 | 1.651 | | | |
| | | | −10+14 | 0.0523 | 5.72 |
| 14 mesh | 0.046 | 1.168 | | | |
| | | | −14+20 | 0.0362 | 8.26 |
| 20 mesh | 0.0328 | 0.833 | | | |
| | | | −20+28 | 0.0264 | 11.33 |
| 28 mesh | 0.0232 | 0.589 | | | |
| | | | −28+35 | 0.0187 | 15.99 |
| 35 mesh | 0.0164 | 0.417 | | | |
| | | | −35+48 | 0.0132 | 22.65 |
| 48 mesh | 0.0116 | 0.295 | | | |
| | | | −48+65 | 0.0093 | 32.15 |
| 65 mesh | 0.0082 | 0.208 | | | |
| | | | −65+100 | 0.0066 | 45.30 |
| 100 mesh | 0.0058 | 0.147 | | | |
| | | | −100 mesh | 0.00193 | 154.92 |
| | | | −100+150 | 0.00467 | 64.03 |
| 150 mesh | 0.0041 | 0.104 | | | |
| | | | −150+200 | 0.00330 | 90.61 |
| 200 mesh | 0.0029 | 0.074 | | | |
| | | | −200 mesh | 0.00097 | 308.25 |

Because of the many practical applications which can be made of the method described, and the necessity of distinguishing clearly between the technique required in the practice of the invention and those procedures which fail to achieve satisfactory bonding, it is desirable to select a considerable number of examples from the much more numerous trials made.

Three fairly typical cases will first be given in which, because of neglect of the teachings of the invention, little or no liquid was formed in situ, and consolidation of the refractory material was not accomplished. These will be followed by examples of the many variations permissible within the scope of the invention.

To further emphasize the difference in techniques, the three examples of failure to apply the principles of the invention and the first nine examples of successful methods will all utilize the same raw materials in the same proportions by weight, but, because of variations in grain size and consequently in relative surface areas, the reactions occurring will follow a number of different courses.

The raw materials chosen are hard-burned (the so-called double-burned) dolomite, and quartzite. Both of these materials are cheaply available of a purity ranging from 95% upwards, and for the sake of simplicity all impurities will be neglected, the dolomite being taken as containing 58.2 CaO and 41.8% MgO, and the quartzite as 100% $SiO_2$. Both materials are available as crushed to about 3/8" (9.42 mm.) maximum size, and they are to be used in the proportions by weight of 92.6 parts of dolomite and 7.4 parts of quartzite. If fully reacted, these will form in each case about 28.1% tricalcium silicate and leave 33.2% of free lime and 38.7% of free magnesia as periclase.

EXAMPLE 1

For use as a fettling material in an open hearth furnace the dolomite and the silica are crushed to pass 3/8" (9.42 mm.) and are then thoroughly mixed and thrown into the hot furnace in the desired position. Since the two materials have almost identical screen analyses, the amount of dolomite of any given screen fraction is on the average 12.5 times that of the silica (92.6/7.4), and their surface areas are in the same proportions. As reaction occurs, traces of low-melting liquid are formed around each particle of silica, large or small, but, because of the large quantity of fine dolomite immediately available, reaction with it to refractory silicates is almost instantaneous, and no appreciable amount of liquid exists at any one time. On account of the coarseness of the reactants, equilibrium is reached (if at all) only after a long period of heating, at which time patches of tricalcium silicate (presumably surrounding some orthosilicate) are distributed throughout the mass, but no appreciable shrinkage has occurred and no general bond has developed. Because of failure to practice the teachings of the invention, the objectives have not been reached.

EXAMPLE 2

In this case the silica is left coarse and the dolomite is finely crushed. This merely aggravates the situation, since more fine dolomite than before is now available for immediate reaction with any low-melting liquid that may be formed. The result is even worse than that of Example 1.

EXAMPLE 3

Both reactants are now crushed to pass 100 mesh, and are slowly heated to 1650° C., the highest temperature of the open hearth furnace, and held at that point for one hour. As in Example 1, the surface areas of the two constituents are again proportional to their respective weights. Since there is a large excess of lime available for combination with the silica, these oxides selectively react in preference to magnesia and silica, as explained above, and the tendency is to form a silicate with a high lime-silica ratio. For reasons which are not wholly clear, the orthosilicate actually begins to form first, and this even at a temperature far below the melting point of any of the possible binary or ternary eutectics. However, being in contact with excess lime at 1650°, the silica ultimately reacts to tricalcium silicate, leaving all the magnesia and much of the lime still free, as already explained, and, since no appreciable amount of liquid has existed at any one time, the mass as a whole is soft and friable. The results will obviously be similar if any other "straight crush" of both reactants be used.

EXAMPLE 4

In this case the dolomite is first crushed to about 3 mesh, a suitable size for fettling steel furnace banks, and the minus 8 mesh material is removed by screening and is ground to pass 100 mesh, as is also the silica. It is decided to use as a bond the lime-magnesia-silica eutectic melting at 1321° C. and containing 30.5, 8.0 and 61.5% of the three oxides, respectively. It is then necessary to calculate the required surface areas of the dolomite and silica. Since, when dolomite is used, there is bound to be an excess of magnesia over that of the eutectic composition, only the lime and silica need be considered as initial reactants. Their proportions by weight are 30.5 and 61.5, and in the ideal case these should also be their relative surface areas. Since, from the above table, the minus 100 mesh silica has a surface area of 155 units per unit weight, the total area is 7.4×155, or 1147 units, and 1147 (30.5/61.5) units are required for the lime, or, of dolomite, (1147/0.582)(30.5/61.5), that is, 976 units. The following tabulation shows how the surface area of the coarse dolomite is calculated from its screen analysis:

*Screen analysis*

| Mesh | Percent by wt. | Area Factor | Total Units of Area |
|---|---|---|---|
| −3+4 | 51 | 1.42 | 72.42 |
| −4+6 | 26 | 2.01 | 52.26 |
| −6+8 | 23 | 2.83 | 65.09 |
| Total | 100 | | 189.77 |
| Per unit | 1 | | 1.90 |

Each unit of coarse dolomite therefore has 1.9 units of area, while each unit of dolomite crushed to pass 100 mesh has 155 units. A simple algebraic calculation shows that, in order to provide 976 units of area, there are then required 87.37 parts of coarse dolomite and 5.23 parts of fine dolomite; these furnish 166 and 810 units of area, respectively.

The above calculation has been given in detail as an illustration of the method used, but, since the 5.23 parts of fine dolomite provide 83% of the required surface area of dolomite, it is obvious that no detailed calculation of the surface area of the very coarse material is necessary. Actually, the results are quite satisfactory when the coarse fraction is entirely disregarded and 6.3 parts of fine dolomite are used to provide the 976 units of surface area. This procedure is permissible when, as here, the coarse particles are on the average of the order of 100 times the average diameter of the particles in the fine fraction and the objective is a highly siliceous liquid.

When the mixture of coarse and fine dolomite and fine silica is subjected to a rising temperature, as in a laboratory test or on the banks of an open hearth furnace, liquid formation occurs and is readily observable as initial fritting at almost exactly 1321° C., the melting point of the eutectic whose composition was the objective. The liquid formed (7.4/0.615 by weight, or roughly 12%) rapidly coats all the larger particles, and as the temperature is raised a series of reactions occur until the pasty mass becomes hard and strong, even at the highest furnace temperature. This condition persists upon cooling.

EXAMPLE 5

In this case a finer dolomite, crushed to pass 6 mesh, is to be bonded at as low a temperature as possible. Since the average particle size is close to half that of the previous example, one may simply remove the minus 16 mesh fraction and grind this, as well as the silica, to pass 200 mesh. The relative grain sizes and surface areas are then substantially the same as before, and the reactions occur in a similar way. Bonding may be effected by burning at 1350° C., but a somewhat higher temperature is desirable if the reactions are to be carried to completion.

A mixture of this kind can be used for fettling, as in Example 4. There are, however, real differences between the two cases. From a practical point of view, it is desirable that little dust be formed when refractory materials are thrown into a furnace, for dust may in some cases be carried out with the furnace gases, as in an open hearth, or it may settle in the middle of a furnace instead of on the banks where it is wanted, as in an electric furnace. The coarser material therefore possesses one practical advantage. On the other hand, very coarse materials do not set as rapidly or to as dense a mass as do those containing a considerable percentage of fines, hence the second type of material may be chosen for this reason.

Further, the coarser materials will take considerably longer to react fully and eliminate all liquid, and will as a consequence remain longer in a plastic or pasty condition. These cases illustrate how the degree of set, the range of temperature during which the plastic condition will persist and the density of the final product may be controlled by varying the grain sizes of the reacting materials.

EXAMPLE 6

This case is similar to that of Example 5, but the average particle diameter of the coarse fraction is again reduced by 50%, that is, to about 0.04″ (1.016 mm.). While such a case is commercially unusual, the same procedure as that previously described may be applied if the fine fraction is ground so as to maintain similar ratios of average diameters and total surface areas of the coarse and fine fractions.

EXAMPLE 7

This is a modification of Example 6, and, on economic grounds, may be preferable to the extremely fine grinding there required. In this case no grinding beyond 100 mesh is necessary, but the contact between the finer fractions which are to be the initial reactants is improved by mixing and pelletizing these materials. The constituents then react in the desired order. Pelletizing is not recommended when brick are to be manufactured, but it is satisfactory for the preparation of composite fettling materials for furnaces.

EXAMPLE 8

There exists still another possible method of dealing with the conditions of Example 6, one which may often prove the most economical. Instead of grinding the silica and part of the dolomite to a high degree of fineness for admixture with the coarse dolomite, the fine dolomite is omitted and the silica is left sufficiently coarse to provide the desired ratio of surface area between this constituent and all of the dolomite.

Since, as in Example 4, it is desired to produce the eutectic melting at 1321° C., the necessary surface areas of the silica and dolomite are again as 1147 and 976. The relative weights are 7.4 and 92.6, hence when all the dolomite is taken into consideration the required average diameter of the particle of silica is $$\frac{0.04 \times 976 \times 7.4}{1147 \times 92.6}$$

or 0.0027" (0.069 mm.) which is a little less than the size of particles passing 150 mesh and retained on 200 mesh. Rather than make a narrow grain size of this kind it is equally satisfactory and much easier to prepare, say, the right proportions of minus 65 plus 100 and minus 100 mesh. In this case calculation shows that the proportions 16.5 and 83.5% will give the desired surface area. This modification, which involves reaction of the silica with the surface portion only of the dolomite present, instead of with specially ground and exceedingly fine dolomite as a more or less independent constituent, is thus seen to require no very fine grinding of the silica. On the average, however, the silica is still much finer than the dolomite, the ratio being roughly fifteen to one.

EXAMPLE 9

In using a mixture of dolomite and silica, instead of screening out the coarser portion and subjecting the fines to further crushing, as in Example 4, the method of crushing can sometimes be altered so as to provide the desired proportion of fines. For example, dolomite reduced to 3 or 4 mesh in a jaw or gyratory crusher may be transferred to a tube or ball mill of small diameter, preferably with the desired proportion of fine silica, and there milled, without the addition of a heavy crushing medium, until the particles are eroded by gradual attrition and any desired proportion of fine material is formed. By simply stopping the mill when a screen analysis of the product shows the desired proportion of fines, there will be obtained a self-setting mixture of coarse and fine material. In a continuous operation, the rate of feed is merely so controlled as to obtain in the product the desired percentage of fines, which is readily calculated as above. It is immaterial whether the silica is of greater fineness than the fine dolomite provided that (1) the ratio of particle size of the coarse and fine fractions of the dolomite is sufficiently great to make them react almost independently, or (2) the total surface area of both coarse and fine dolomite fractions bears the desired relation to that of the silica.

EXAMPLE 10

In Examples 4–9 the objective in each case was the formation of about 12% of the lime-magnesia-silica eutectic melting at 1321° C., and this result was substantially attained in all cases. Using the same raw materials in exactly the same proportions, however, it is quite possible by regulating the grain sizes of the constituents to form a different proportion of some other low-melting material to act as a bond. It may be desirable, for example, to produce a greater quantity of liquid of lower viscosity. Reference to the lime-magnesia-silica phase equilibrium diagram shows that there is in this system a eutectic melting at 1359° C. and having the composition 29.7 CaO, 20.3 MgO and 50.0% SiO$_2$. Because of its lower silica content, it has a considerably lower viscosity than that of the 1321° eutectic, and when formed from 7.4% silica and dolomite it will obviously produce 14.8% liquid, as compared with the 12% of the former cases. These proportions are both within the most desirable range. Using the same method of calculation as that given in Example 4, the proportion of minus 100 mesh dolomite is merely increased until its surface area (strictly speaking, including also the surface area of the coarser dolomite) bears the desired relation to that of the silica. Since in this case there is practically no selective action as between lime and magnesia, it is correct to take the total surface area of the dolomite instead of that of the lime only, and, the silica being 50% of the total weight, equal areas are required. On being heated, a little of the 1321° eutectic is undoubtedly formed first, but as soon as the temperature rises sufficiently this quickly passes over to the 1359° eutectic, because of the additional fine lime and magnesia present, and effective bonding subsequently takes place.

EXAMPLE 11

This example has been chosen to define one approximate limit of the range in which this method can be satisfactorily used in bonding granular dolomite with silica. That limit, however, is not inherent in the method of reaction to form liquid in situ, but arises rather from the fact, brought out in the previous applications, that the low-melting constituent should itself be substantially all liquid at 1500° C. in order to constitute a satisfactory bond for refractory granules of dolomite. In the present case this requires a silica content of approximately 42% in the low-melting constituent. Such a bond can be formed in situ by using with 7.4 parts of minus 100 mesh silica 92.6 parts of dolomite of such a grain size that the surface area will be 58/42 of 1147, or 1584 units. Trial has shown that, while reaction of these constituents does readily occur in the manner desired, the bond is not as strongly developed as with low-melting constituents higher in silica, and this case is therefore regarded as marginal. The method is applicable down to 42% silica, but not below. This limit is of course the same as that of the surface area of the silica relative to the total surface area of all particles in the complete mixture.

EXAMPLE 12

There remains for consideration in the series of dolomite-silica combinations a very important case, which represents the extreme limit in the other direction. That extreme is the use of 7.4% of fine, free silica with coarse, hard-burned dolomite of any commercial grain size having little or no fine fraction present. Actually, if anywhere from about 5 to 15% of fine silica be used, and fine dolomite be substantially absent, good bonding is secured. This surprising result is explained by a study of the lime-magnesia-silica phase equilibrium diagram. This discloses the fact that, when fine silica having a large surface area reacts with coarse dolomite having a small surface area (that is, when a large proportion of silica reacts with a relatively small proportion of dolomite), a little of the 1321° eutectic is still formed. At any temperature higher than this, solution of the remaining solids begins, and base and acid at any particular time react in proportion to the instantaneous values of their surface areas. Because of the preponderating surface area of the fine silica, the melt becomes increasingly siliceous as the temperature increases until the silica has been largely absorbed, as explained in principle 5, above. Then the course of reaction is reversed, and as the siliceous melt coats the coarse dolomite particles it continues reacting with them until its composition has passed, with increasing quantity of liquid, through the low-melting areas in which the 1321 and 1359° eutectic lie, and finally into the area in which refractoriness increases rapidly towards final equilibrium. When 7.4% of silica is used, the ultimate products are exactly as before.

This discloses the principle—one of general application—that, even when starting with pure silica or highly refractory silicates, if grain sizes are so controlled that the trend of liquid formation, after disappearance of the silica or silicate as such, is directed across an area of low-melting compositions or eutectics, there will be a continuous series of melts of decreasing acidity formed, and at one or more points in that series conditions will be highly favourable to the development of liquids which constitute effective bonding agents for basic refractory granular materials.

The application of this particular principle, although ordinarily avoiding the necessity for anything but a rough estimate of the surface areas of the reactants, is not in all cases superior to the techniques described in previous examples, for, in the use of a relatively large amount of coarse basic refractory material and a small amount of fine, acid reactant, there ordinarily results a product of higher porosity, which for some purposes is less serviceable than denser material derived from a wider range of grain sizes.

EXAMPLE 13

In all of the previous examples one of the raw materials has been a hard-burned dolomite, such as is commonly used in fettling open hearth and electric steel furnaces. The method of bonding by reaction and liquid formation in situ is also equally applicable to mixtures containing raw dolomite, which when pure contains 30.4 lime, 21.9 magnesia and 48.7% carbon dioxide. Using the method of calculation given in Example 4, it is evident that to form the same 1321° eutectic and final product one must use with 7.4 parts of fine silica 92.6/0.513 or 180.6 parts of raw dolomite, of which 170.4 parts may be minus 3 plus 8 mesh and 10.2 parts should be ground to the fineness of the minus 100 mesh silica. In other words, one considers only the one-volatile oxides present. The raw dolomite and silica were strongly bonded after heating to 1400° C. and cooling to room temperatures. The product was undesirably porous, but so thoroughly were the coarse particles glazed that when the mass was kept under water for 48 hours the amount of slaking occurring was almost negligible, in spite of its high content of free lime.

It is evident that, if desired, one can make up a large quantity of a mixture of 7.4 parts of fine silica and 10.2 parts of fine raw dolomite, which will keep indefinitely without deterioration, and use this as required in admixture with coarser hard-burned dolomite. Other proportions may sometimes be advantageous.

EXAMPLE 14

On some steel plants raw dolomite from which the fines have been removed is largely used as a fettling material for open hearth furnaces, but of itself this does not "set" in position, and therefore usually affords only temporary protection to the banks, being carried off by the slag and having to be replaced at the end of every heat. Much greater stability can be secured by utilizing the same principle as in Example 12 and incorporating in such dolomite about 5-10% of fine silica. In order to reduce segregation and dustiness, it may be desirable (1) to apply the mixture wet, with or without a temporary bond, in order to make the fines coat the coarser particles, or (2) to pelletize the silica. If the latter course is adopted, it is preferable to use a mixture of 7.4 parts of fine silica and 10.2 parts of fine raw dolomite, in order to form the 1321° eutectic in situ prior to reaction with the coarse dolomite, as in Example 13.

EXAMPLE 15

In all of the above examples free silica has been used as the siliceous material. Frequently, however, it is more convenient or economical to use other raw materials. For example, there are available in the Province of Quebec two waste products, neither of which is itself of the most desirable composition for use as a low-melting constituent, but which, finely ground and mixed together in suitable proportions, are excellent starting materials for the formation of low-melting eutectics in situ. These materials and their approximate compositions are as follows:

|  | CaO | MgO | $SiO_2$ | $Al_2O_3$ | FeO | $P_2O_5$ | L. O. I. |
|---|---|---|---|---|---|---|---|
| A. Phosphorus furnace slag | 47.4 | 0.5 | 44.1 | 4.0 | 0.2 | 1.2 | 0.0 |
| B. Asbestos waste (mostly serpentine) | 1.0 | 38.0 | 38.0 | 1.5 | 8.0 |  | 13.5 |
| Mixture of 55% A and 45% B (calculated dead-burned basis) | 28.7 | 18.8 | 44.7 | 3.1 | 4.0 | 0.7 |  |

One secures as the product of reaction of 55 parts slag (essentially calcium metasilicate) and 45 parts asbestos waste in situ a low-melting composition which, on the basis of its principal constituents alone, contains 31.1 lime, 20.4 magnesia and 48.5% silica, proportions very close to those of the 1359° eutectic, which has the composition 29.7, 20.3 and 50.0%, respectively. The presence of the minor oxides will bring about fusion at a slightly lower temperature, yet they are not present in sufficient quantity to affect appreciably the composition of the final product when, say, 5.5 parts of slag and 4.5 parts of asbestos waste as minus 100 mesh constituents are mixed with 90 parts of relatively coarse burned dolomite. Excellent bonding results when these are burned together. Raw dolomite may also be used as the refractory granular material.

Other magnesium silicates, such as olivine, talc, forsterite and enstatite may be substituted for asbestos waste. When used with calcium metasilicate, in substantially equal proportions, suitable low-melting compositions are produced.

EXAMPLE 16

If it be desired instead to make the 1321° eutectic in situ by using the same raw materials it is necessary to add also some fine silica, and, as calculation shows, the use of 58 parts of slag, 20 of asbestos waste and 22 of silica yields a product containing the three major constituents in the proportions 30.5 lime, 8.7 magnesia and 60.8% silica, which is close enough for all practical purposes to the composition of the eutectic, with 31.5, 8.0 and 61.5%, respectively. The over-all mixture may then consist of 5.8 parts of slag, 2.0 of asbestos waste and 2.2 of silica, all ground to 100 mesh or finer, and 90 parts of relatively coarse burned dolomite. The bond developed on burning is fully as good as that of Example 15.

The same eutectic is equally well made in situ by the use of 40 parts of slag, 42 of silica and 18 of dolomite, all as fines, which on reacting will produce liquid containing the three major oxides in the proportions 30.4 lime, 8.0 magnesia and 61.6% silica, again illustrating how easy it is to proportion suitable raw materials so as to produce substantially a eutectic composition.

EXAMPLE 17

Good results are also obtained when the fine dolomite of the immediately preceding example is omitted and the same proportions of fine slag and silica are used. These two constituents then begin to react with each other and with the coarse dolomite at 1321° C. or below and continue to react until they have absorbed enough lime and magnesia to again reach the eutectic composition. As in Examples 12 and 14, success is attained in the formation of a eutectic in situ because the composition of the initial reactants is directed across an area of low-melting compositions by reaction with the surface portions of the refractory granular particles themselves.

EXAMPLE 18

Liquid formation in situ is equally well brought about in a binary system, such as that of lime and silica, although such cases are usually of less commercial interest. For example, coarse burned lime mixed with fine silica and enough fine lime to give, upon heating, a liquid of the 1438° eutectic composition having 36 lime and 64% silica, reacts to form the bond for the coarser lime.

EXAMPLE 19

Reaction and liquid formation in situ are of at least equal interest in the magnesia-alumina-silica field, where it is possible to utilize the method described for the purpose of bonding granular magnesia. For example, a ramming material can be made for the permanent bottoms of open hearth steel furnaces by combining with granular magnesia a mixture of 42 parts of fine serpentine and 58 parts of ball clay having the following compositions:

|  | CaO | MgO | SiO$_2$ | Al$_2$O$_3$ | FeO | Alk. | L. O. I. |
|---|---|---|---|---|---|---|---|
| A. Serpentine | 1.0 | 41.5 | 41.5 | 0.5 | 1.2 | | 14.3 |
| B. Ball Clay (essentially aluminum silicate) | 0.5 | 0.2 | 62.9 | 28.1 | 1.0 | 2.0 | 5.3 |
| Mixture of 42% A and 58% B (calculated dead-burned basis) | 0.8 | 19.3 | 59.3 | 18.1 | 1.2 | 1.3 | |

In this mixture the magnesia, silica and alumina are present in the proportions 20.0, 61.3 and 18.7, compared with 20.3, 61.4 and 18.3, respectively, for the 1347° eutectic, which is perhaps the most favorable composition in the system. If the raw constituents cannot readily be balanced to the desired percentage of silica, a little free silica may be added, on the one hand, or a less siliceous clay may be used, on the other. There is available as a coarse material (about minus 10 plus 20 mesh) dead-burned granules of brucite recovered from rock near Wakefield, Quebec, and 80 parts of these are combined with 20 parts of the plastic serpentine-clay mixture and rammed into a furnace bottom. If desired, a small proportion of sodium silicate or other suitable chemical bond may also be added, but with a good bonding clay this is not essential. Upon drying, considerable strength is developed, and upon burning, the 1347° eutectic is first formed in situ and this then reacts with the magnesia of the granules to form a highly refractory mixture of periclase, forsterite and magnesium aluminate spinel.

EXAMPLE 20

There is another desirable eutectic in the magnesia-alumina-silica system melting at 1362° C. and containing 25, 21 and 54%, respectively, of these three oxides. It may be formed in situ in a similar way to the 1347° eutectic of Example 19 by combining about equal parts of fine olivine and kaolin with granular sea water magnesia or other material of similar composition crushed to a suitable (always relatively coarse) grain size. However, when the 1347° eutectic is formed and this subsequently reacts with magnesia, a considerable proportion of the 1362° eutectic is always produced, hence the latter is seldom the primary objective.

It is clear from a study of the magnesia-alumina-silica phase equilibrium diagram that desirable low-melting liquids may be formed in situ by the reaction of other raw materials than those given in Examples 19 and 20. Forsterite, enstatite or talc may be substituted for the magnesia-bearing serpentine of Example 19, and calcined clays or brick grog for the alumina-bearing ball clay. Substantially equal proportions of each type of silicate will still produce the useful low-melting compositions, and final adjustments may be made, if desired by the addition of magnesia, silica or aluminous materials in suitable proportions.

It will be observed that in Examples 15-20 the starting materials for the non-refractory silicate must be so fine that they react with one another practically independently of the coarse aggregate.

EXAMPLE 21

In order to obtain information, a series of laboratory tests was carried out on minus 100 mesh silica and a "straight crush" of dead-burned dolomite, in which, in successive tests, the proportions of dolomite and silica were held constant but a coarse fraction of dolomite was omitted; the surface area was therefore gradually increased. The following results were obtained:

| Test No. | 1 | 2 | 3 | 4 | 5 |
|---|---|---|---|---|---|
| Dolomite | −⅜″ (9.42 mm.) | −3 M. | −4 M. | −8 M. | −20 M. |
| Relative Surface Areas: | | | | | |
| 84% Dolomite | 736 | 953 | 1,300 | 2,156 | 4,080. |
| 16% Silica | 2,480 | 2,480 | 2,480 | 2,480 | 2,480. |
| Percent silica at initial reaction point (=percent total surface area) | 77.1 | 72.2 | 65.6 | 53.5 | 37.8. |
| Observations on burning to 1400° C. and cooling to room temperature | Very good bond, severe glazing, very porous. | Very good bond, less severe glazing than No. 1, porous. | Fair bond, moderate glazing, relatively nonporous. | Fair bond, not as good as No. 3 but better than No. 5. | Holds together but readily friable. |
| Observations on burning to 1500° C. and cooling to room temperature | Very good bond, severe glazing. | Very good bond, severe glazing. | Very good bond, moderate to severe glazing. | Fairly good bond, slight glazing. | Friable, but less so than at 1400; particles can be rubbed off. |

As the lime-magnesia-silica phase equilibrium diagram shows, the first two of these were excellent because the initial compositions crossed a low-melting area, the third and fourth were satisfactory because they were close to the eutectic compositions at 1321 and 1359° C., respectively, and the fifth was unsuccessful because so much fine dolomite was present that too little liquid was formed, a temperature of 1650° C. being required for complete fusion of the initial reactants.

EXAMPLE 22

In another series of laboratory tests seven mixes were made up in each of which 7.4% of minus 100 mesh silica was used with combinations of minus 3 plus 8 mesh and minus 100 mesh burned dolomite, the last two constituents ranging from 0 to 92.6% and 92.6% to 0, respectively. The conditions of the experiments and the results obtained are given in the following table:

continued to be taken into solution until the silica supply was exhausted (at a temperature of 1400° the melt would contain about 62.5% silica), following which dolomite absorption continued through the low-melting composition areas of the 1321 and 1359° eutectics to a silica content of approximately 48%, at which point complete solidification resulted at 1400° C. At a temperature of 1500° C., used in a parallel experiment, liquid elimination did not result until the silica content was reduced to about 42%. These cases therefore correspond to Example 12. It may be observed that Test 7 was described as having the best bond of all; because of the paucity of fines, however, the ultimate product was very porous. Tests 4 and 5 were of the best density. Ample evidence was obtained of the selective action of silica with lime in preference to magnesia; had the latter reacted in the full proportion in which it was present, much less of the eutectic liquids

| Test No. | 1 | 2 | 3 | 4 | 5 | 6 | 7 |
|---|---|---|---|---|---|---|---|
| Percent −3+8 m. dolomite | 0.0 | 67.5 | 76.9 | 86.3 | 87.17 | 90.35 | 92.6. |
| Percent −100 m. dolomite | 92.6 | 25.1 | 15.7 | 6.3 | 5.43 | 2.25 | 0.0. |
| Percent −100 m. silica | 7.4 | 7.4 | 7.4 | 7.4 | 7.4 | 7.4 | 7.4. |
| Relative Surface Areas: | | | | | | | |
| −3+8 mesh dolomite | 0 | 130 | 148 | 166 | 167 | 173 | 178. |
| −100 mesh dolomite | 14,350 | 3,890 | 2,433 | 976 | 842 | 349 | 0. |
| −100 mesh silica | 1,147 | 1,147 | 1,147 | 1,147 | 1,147 | 1,147 | 1,147. |
| Percent silica at initial reaction point (equal to percent of total surface area) | 7.4 | 22.2 | 30.8 | 50.1 | 53.2 | 68.7 | 86.6. |
| Observations on burning to 1,400° C. and cooling to room temperature. | Soft like dried clay. | Poor bond | Insufficient bond. | Good bond | Good bond | Good bond | Best bond of all. |

The results in the first three tests were very poor, because the proportions and grain sizes were such that any low-melting liquid was eliminated substantially as fast as formed, through reaction with fine dolomite having a much greater surface area than that of the silica. All of these illustrate the poor results obtained when the teachings of the invention are disregarded. Tests 4 and 5 were both successful, for the silica in the non-refractory silicates first formed ranged from 50.1 to 53.2% and, as a consequence, these non-refractory silicates were completely molten well below 1400° C. Nos. 6 and 7 were bonded at least equally well, although the temperatures of complete liquidity of the primary silicates were about 1650 and 1710° C., respectively, for after initial liquid formed, at 1321° C., both of the remaining solids (silica and dolomite) would have been formed and bonding at 1400° would have been less satisfactory.

The above examples of the conditions which do and do not lead to satisfactory bonding of granules of refractory material will, with the discussion of the principles involved, indicate to those skilled in the art how best to obtain the desired results. The limits of the invention, however, need to be more precisely defined.

The discrete or granular particles of refractory material are normally those used in commercial practice in the manufacture of brick, in fettling steel furnaces, etc., the size range of which is from a product which will substantially all pass 8 mesh to one in which the largest particles are 0.75–1.0″ (19.05–25.40 mm.) in size. On the coarser side, there is no specific limit beyond which the method is inapplicable, but on the finer side the practical limit is the use of granular materials of which at least 50% will be retained on a 20-mesh screen.

These granular materials must contain one of several reactive alkaline earths, the principal of which is lime and magnesia. Of these, lime is the more basic, and it is therefore the reactive oxide when used alone or, as in dolomite and Quebec dead-burned magnesite, there is at least 10% by weight of lime present and at least 6% of lime in excess of that necessary to combine with all the silica as calcium orthosilicate. Substantially all of the magnesia is then present as inert periclase. When appreciable lime is present, aluminum is objectionable in that it forms low-melting compounds that are not eliminated by reaction with more lime.

In most commercial magnesites there is more than 80% magnesia, little alumina and less than 5% by weight of lime, and magnesia is then the reactive basic oxide. By reaction with the silica and any alumina present in the non-refractory silicate it converts these into refractory magnesium orthosilicate and magnesium aluminate, and must therefore be present in the final mixture in a weight ratio at least substantially equal to 1.34 times the silica and 0.40 times the alumina. Were a smaller proportion of magnesia used (or, similarly, a larger proportion of silica), some of the magnesia at ultimate equilibrium would occur as the non-refractory magnesium-aluminum silicate cordierite (2MgO.2Al₂O₃.5SiO₂) rather than as the refractory orthosilicate forsterite (2MgO.SiO₂). For optimum application of the invention when magnesia is the reactive oxide, 10% or more or free magnesia in the granules is necessary.

The preparation of a non-refractory silicate by provision of appropriate starting material in reactive form has already been discussed. Suitable reactive form can be provided by fine grinding and mixing of the initial reactants, in order to produce a large surface of contact between them, either of the solid constituents themselves or between initial liquid and the finer particles, as, for example, in the case of fine silica in contact with only coarse, hard-burned dolomite. It can also be provided, without extremely fine grinding, by pelletizing, briquetting or otherwise improving the contact between the constituents of the starting material for the non-refractory silicates, so that reaction between these constituents occurs almost independently of other solids present, whether coarse or fine.

The term "non-refractory silicates" relates to eutectics, and especially ternary eutectics, and includes also a few low-melting compounds, such as diopside (CaO.MgO.2SiO₂) and åkermanite (2CaO.MgO.2SiO₂), but not monticellite

(CaO.MgO.SiO₂) g which is too low in silica to be effective. The most useful eutectics are those which melt in the range 1300–1400° C., but, as the phase equilibrium diagrams show, there are considerable ranges of composition in which a high proportion of liquid is formed at low temperatures, and the invention includes all such ternary ranges in which the non-refractory silicate is substantially all molten at 1500° C., as well as the corresponding binary ranges in which substantial amounts of liquid are formed at 1550° C. Expressed in terms of silica content, the range of composition of the non-refractory silicates of the invention includes all of those in which the starting material as a group, on the dead-burned or loss-free basis, contains at least 42% silica. In other words, the total surface area of all the non-volatile oxides in the particles of the over-all mixture of granular particles and siliceous material is not more than 2.4 times the surface area of the free and combined silica in the mixture.

The granular material to be bonded frequently contains a little combined silica. Normally, it will not be present in the coarse granular particles in sufficient proportion to affect appreciably the surface area of the free and combined silica, but, as in the case of the Quebec calcareous magnesite, it may even provide the major portion of the silica in the final mixture, and it is then essential to include it in calculating the composition of the ultimate product.

The starting material for the non-refractory silicates includes the actual portions of the complete mixtures which by reaction enter into the non-refractory silicates. When the surface areas and grain sizes are so controlled as to bring about fusion of the fines almost independently of the coarse granular refractory, these fine fractions constitute substantially the whole starting material, but when the surfaces of the granular refractory are themselves depended upon to form low-melting silicates by reaction with silica or silicates introduced as a fine fraction, the granules to this extent are also true starting material and are to be so interpreted herein. It will be obvious, however, that even in the latter case the granular refractory is present in large excess, and only those portions of it becoming a constituent of non-refractory silicates containing at least 42% silica are actual starting material for those silicates.

This invention includes those mixtures of granular refractory materials and the starting material for non-refractory silicates which upon complete reaction result in the substantial elimination of low-melting liquids. Given the composition of the reactants, the calculation of the minimum proportion of granular refractory necessary is relatively simple, but in ordinary practice the proportion used is much greater than this minimum. As examples, in making brick containing 10–20% lime, it may be desirable to balance lime and silica just to dicalcium silicate, whereas in the application of dolomite as a fettling material only enough silica is used to bond the mass well, since the introduction of much silica into basic steel furnaces is objectionable. The silica then forms tricalcium silicate with part of the lime, and all the magnesia and most of the lime are left free. With excess magnesia, but no lime, all the silica reacts to form forsterite (2MgO.SiO₂) and all the alumina to form spinel (MgO.Al₂O₃), much magnesia usually still remaining as periclase.

A number of practical applications of this method of bonding have been given in the examples. Some of the most useful applications are in the manufacture of brick, fettling materials and ramming mixes for furnace bottoms. However, the invention is not limited to any particular commercial uses, but only to the application of a method in which, by the control of grain sizes—which in turn are determined by the surface areas required—the bonding of basic refractory granular materials is brought about in two distinct stages, in the first of which the starting materials of a low-melting silicate are reacted in situ to produce it in liquid form, and in the second of which this low-melting silicate is itself substantially eliminated by reaction with the granular particles to be bonded. These granular particles, as explained above, may in some cases themselves contribute one or more of the constituents of the non-refractory silicate, but they nevertheless always remain in substantially their original physical condition, and when they have reacted with the liquid formed in situ are themselves strongly bonded together.

This application is a continuation in part of United States application Serial Number 688,264, filed August 3, 1946, now Patent No. 2,568,237, September 18, 1951.

I claim:

1. A method of consolidating granular particles of basic refractory material containing a reactive alkaline earth which is present in the said refractory granular material in proportion of at least 6% by weight of the particles in excess of that required to form under equilibrium conditions the orthosilicate of the said alkaline earth with all the silica present, which comprises forming an intimate mixture containing said granular particles of refractory material and, in reactive form, starting material for a non-refractory silicate of said reactive alkaline earth, said intimate mixture containing no more silica than will combine at ultimate equilibrium with the reactive alkaline earth as the orthosilicate, and the total surface area of all non-volatile constituents in said mixture being not more than 2.4 times the total surface area of the free and combined silica therein, heating the mixture to form and melt the non-refractory silicate in situ and thereby coat the granular particles of refractory material, and further heating the mass to convert the non-refractory silicate by reaction with excess reactive alkaline earth into a refractory silicate and thereby bond the granular particles into a consolidated and highly refractory mass.

2. A method of consolidating granular particles of basic refractory material containing a reactive alkaline earth which is present in the said refractory granular material in proportion of at least 6% by weight of the particles in excess of that required to form under equilibrium conditions the orthosilicate of the said alkaline earth with all the silica present, which comprises forming an intimate mixture of said refractory material and pellets of finely divided starting material for a non-refractory silicate of said alkaline earth containing at least 42% silica, said intimate mixture containing no more silica than will combine at ultimate equilibrium with the alkaline earth as the orthosilicate, heating the mixture to react and melt the pelletized material, forming in situ a liquid silicate to coat the granular particles of refractory material, and further heating the mass to convert the non-refractory silicate by reaction with excess reactive alkaline earth into a refractory silicate and thereby bond the granular particles into a consolidated and highly refractory mass.

3. A method of consolidating granular particles of basic refractory material containing a reactive alkaline earth which is present in the said refractory granular material in proportion of at least 6% by weight of the particles in excess of that required to form under equilibrium conditions the orthosilicate of the said alkaline earth with all the silica present, which comprises forming an intimate mixture containing said granular particles of basic refractory material and finely divided siliceous material containing at least 80% silica, said intimate mixture containing no more silica than will combine at ultimate equilibrium with the reactive alkaline earth as the orthosilicate, and the total surface area of all non-volatile constituents in said mixture being not more than 2.4 times the total surface area of the free and combined silica therein, heating the mixture to form in situ a eutectic liquid melting below 1400° C. and containing at least 50% silica, and further heating to promote reaction between said eutectic liquid and the remaining siliceous material and basic granular material, thereby eliminating said siliceous material and converting all the silica present into a refractory silicate of said alkaline earth and bonding the granular particles into a consolidated and highly refractory mass.

4. A method of consolidating granular particles of basic refractory material containing a reactive alkaline earth which is present in the said refractory granular material in proportion of at least 6% by weight of the particles in excess of that required to form under equilibrium conditions the orthosilicate of the said alkaline earth with all the silica present, which comprises forming an intimate mixture consisting of a major portion of said relatively coarse basic refractory granular material to be bonded and a minor portion of finely divided and substantially complete starting material to react and form a non-refractory liquid silicate containing said reactive alkaline earth and at least 42% silica, said intimate mixture containing no more silica than will combine at ultimate equilibrium with the reactive alkaline earth as the orthosilicate, and the total surface area of all non-volatile constituents in said mixture being not more than 2.4 times the total surface area of the free and combined silica therein, heating the mixture to form and melt the non-refractory silicate in situ to coat the particles of basic granular material and further heating the mass to convert all the silica present into a refractory silicate of said alkaline earth, thereby bonding the granular particles into a consolidated and highly refractory mass.

5. A method of making refractory masses and shapes which comprises forming an intimate mixture of materials of two types, the first type consisting of basic refractory granular particles containing magnesia and at least 10% by weight of lime and having excess lime at least 6% by weight of the particles greater than that required to form calcium orthosilicate with any silica in said refractory granular particles, and the second type consisting of siliceous starting material for a non-refractory calcium-magnesium silicate, the siliceous starting material being finely divided relative to said granular particles, and the said intimate mixture of basic granular particles and siliceous starting material having a total surface area of the non-volatile constituents of all its particles not more than 2.4 times the total surface area of the free and combined silica in said mixture and having a weight ratio of lime to silica in said mixture at least substantially as great as that in calcium orthosilicate, heating the mixture to form and melt the non-refractory calcium-magnesium silicate in situ and thereby coat the granular particles of refractory material, and further heating the mass to convert the non-refractory silicate by reaction with said excess lime into periclase and a calcium silicate at least substantially as basic as the orthosilicate, and thereby bond the granular particles into a consolidated and highly refractory mass.

6. A method of making refractory masses and shapes which comprises forming an intimate mixture of materials of two types, the first type consisting of basic refractory granular particles being essentially magnesia with not more than 5% by weight of lime and having free magnesia at least 10% by weight of the particles in excess of that required to form magnesium orthosilicate with any silica and magnesium aluminate with any alumina in said granular particles, and the second type consisting of siliceous starting material for a non-refractory magnesium-aluminum silicate, the said starting material being finely divided relative to the said granular particles and the said intimate mixture of basic granular particles and siliceous starting material having a total surface area of the non-volatile constituents of all its particles not more than 2.4 times the total surface area of the free and combined silica in said mixture and having a weight ratio of magnesia to silica and alumina in said mixture at least substantially 1.34 times the silica plus 0.40 times the alumina, heating the mixture to form and melt the non-refractory magnesium-aluminum silicate in situ and thereby coat the granular particles of refractory material, and further heating the mass to convert the non-refractory silicate by reaction with the said excess magnesia into forsterite, magnesium aluminate and periclase, and thereby bond the granular particles into a consolidated and highly refractory mass.

7. A method as defined in claim 5 in which the proportions of lime, magnesia and silica in the starting material are essentially those of the eutectic melting at 1321° C. and containing 30.5 lime, 8.0 magnesia and 61.5% silica.

8. A method as defined in claim 5 in which the starting material for the non-refractory silicate contains magnesium silicate and calcium metasilicate in substantially equal proportions.

9. A method as defined in claim 5 in which free silica is a starting material for the non-refractory silicate.

10. A method as defined in claim 9 in which the siliceous starting material contains burned dolomite.

11. A method as defined in claim 9 in which the siliceous starting material contains raw dolomite.

12. A method as defined in claim 1 in which the refractory granular particles to be bonded are raw dolomite.

13. A method as defined in claim 12 in which the siliceous starting material is finely ground free silica.

14. A method as defined in claim 12 in which the siliceous starting material contains calcium metasilicate and a silicate of magnesia.

15. A method as defined in claim 6 in which the non-refractory silicate contains magnesia, alumina and silica essentially in the proportions of the eutectic melting at about 1347° C. and containing 20.3 magnesia, 18.3 alumina and 61.4% silica.

16. A method as defined in claim 6 in which the siliceous starting material for the non-refractory silicate contains a magnesium silicate and an aluminum silicate in substantially equal proportions.

17. A method as defined in claim 1 in which the non-refractory silicate constitutes 6-30% by weight of the basic refractory granular particles to be bonded.

18. A method as defined in claim 17 in which the non-refractory silicate is substantially all molten at 1500° C.

19. A method as defined in claim 17 in which the non-refractory silicate is substantially a binary eutectic and the bonding temperature is about 1550° C.

20. A method as defined in claim 1 in which at least 50% by weight of the refractory granular particles to be bonded are retained on a 20 mesh screen.

21. A method as defined in claim 20 in which the surface area per unit weight of the non-refractory silicate is at least 15 times as great as that of the refractory granular particles to be bonded.

22. A batch material for refractory masses and shapes which consists of an intimate mixture of materials of two types, the first type consisting of basic granular refractory particles containing a reactive alkaline earth oxide, said reactive basic oxide being present in said refractory particles in amount greater than that required to form at ultimate equilibrium the orthosilicate with any silica in said refractory particles and the second type consisting of siliceous starting material for a non-refractory silicate of said alkaline earth, the siliceous constituents for the non-refractory silicate being finely divided relative to said granular refractory particles, the total surface area of the non-volatile constituents of all the particles in said mixture being not more than 2.4 times the total surface area of the free and combined silica therein, and said mixture containing no more silica than will combine at ultimate equilibrium with the reactive alkaline earth as the orthosilicate.

23. A batch material for refractory masses and shapes which consists of an intimate mixture of materials of two types, the first type being basic refractory granular particles containing magnesia and at least 10% by weight of lime and having excess lime at least 6% by weight of the particles greater than that required to form calcium orthosilicate with any silica in said refractory particles, and the second type being siliceous starting material for a non-refractory calcium-magnesium silicate, the siliceous starting material being finely divided relative to said granular particles, and the said intimate mixture of basic granular particles and siliceous starting material having a total surface area of the non-volatile constituents of all its particles not more than 2.4 times the total surface area of the free and combined silica in said mixture and having a weight ratio of lime to silica in said mixture at least substantially as great as that in calcium orthosilicate.

24. A batch material for refractory masses and shapes which consists of an intimate mixture of materials of two types, the first type being basic refractory granular particles consisting essentially of magnesia with not more than 5% by weight of lime and having free magnesia at least 10% by weight of the particles in excess of that required to form magnesium orthosilicate with any silica and magnesium aluminate with any alumina in said granular particles, and the second type being siliceous starting material for a non-refractory magnesium-aluminum silicate, the said starting material being finely divided relative to the said granular particles, and the said intimate mixture of basic granular particles and siliceous starting material having a total surface area of the non-volatile constituents of all its particles not more than 2.4 times the total surface area of the free and combined silica in said mixture and having a weight ratio of magnesia to silica and alumina in said mixture at least substantially 1.34 times the silica plus 0.40 times the alumina.

FRANK E. LATHE.

References Cited in the file of this patent

UNITED STATES PATENTS

| Number | Name | Date |
|---|---|---|
| 1,160,085 | Meyer | Nov. 9, 1915 |
| 1,206,771 | Barr | Nov. 28, 1916 |
| 1,210,431 | Davison | Jan. 2, 1917 |
| 1,300,631 | Meyer | Apr. 15, 1919 |
| 1,483,469 | Meyer | Feb. 12, 1924 |
| 1,751,234 | Garnett | Mar. 18, 1930 |
| 2,015,446 | Cape et al. | Sept. 24, 1935 |
| 2,113,818 | Sullivan | Apr. 12, 1938 |